United States Patent
DeTone et al.

(10) Patent No.: US 10,726,570 B2
(45) Date of Patent: Jul. 28, 2020

(54) METHOD AND SYSTEM FOR PERFORMING SIMULTANEOUS LOCALIZATION AND MAPPING USING CONVOLUTIONAL IMAGE TRANSFORMATION

(71) Applicant: Magic Leap, Inc., Plantation, FL (US)

(72) Inventors: Daniel DeTone, San Francisco, CA (US); Tomasz Jan Malisiewicz, Mountain View, CA (US); Andrew Rabinovich, San Francisco, CA (US)

(73) Assignee: Magic Leap, Inc., Plantation, FL (US)

( * ) Notice: Subject to any disclaimer, the term of this patent is extended or adjusted under 35 U.S.C. 154(b) by 75 days.

(21) Appl. No.: 16/020,541

(22) Filed: Jun. 27, 2018

(65) Prior Publication Data

US 2019/0005670 A1     Jan. 3, 2019

Related U.S. Application Data

(60) Provisional application No. 62/526,203, filed on Jun. 28, 2017.

(51) Int. Cl.
*G06T 7/593* (2017.01)
*G06K 9/62* (2006.01)
(Continued)

(52) U.S. Cl.
CPC .......... *G06T 7/593* (2017.01); *G06K 9/00201* (2013.01); *G06K 9/00671* (2013.01);
(Continued)

(58) Field of Classification Search
CPC ......... G06T 7/337; G06T 7/579; G06T 7/593; G06T 7/35; G06T 2207/30244;
(Continued)

(56) References Cited

U.S. PATENT DOCUMENTS

| 2007/0031064 A1* | 2/2007 | Zhao | G06K 9/00214 |
| | | | 382/285 |
| 2011/0234815 A1* | 9/2011 | Zahnert | G06K 9/228 |
| | | | 348/207.1 |

(Continued)

OTHER PUBLICATIONS

Detone, et al., "Deep Image Homography Estimation", Available online at https://arxiv.org/abs/1606.03798, Jun. 13, 2016, 6 pages.
(Continued)

*Primary Examiner* — Syed Haider
(74) *Attorney, Agent, or Firm* — Kilpatrick Townsend & Stockton LLP

(57) ABSTRACT

Augmented reality devices and methods for computing a homography based on two images. One method may include receiving a first image based on a first camera pose and a second image based on a second camera pose, generating a first point cloud based on the first image and a second point cloud based on the second image, providing the first point cloud and the second point cloud to a neural network, and generating, by the neural network, the homography based on the first point cloud and the second point cloud. The neural network may be trained by generating a plurality of points, determining a 3D trajectory, sampling the 3D trajectory to obtain camera poses viewing the points, projecting the points onto 2D planes, comparing a generated homography using the projected points to the ground-truth homography and modifying the neural network based on the comparison.

17 Claims, 10 Drawing Sheets

(51) Int. Cl.
*G06T 7/33* (2017.01)
*G06T 7/35* (2017.01)
*G06K 9/00* (2006.01)
*G06T 7/579* (2017.01)
*G06K 9/46* (2006.01)

(52) U.S. Cl.
CPC ........... *G06K 9/4628* (2013.01); *G06K 9/627* (2013.01); *G06K 9/6211* (2013.01); *G06T 7/337* (2017.01); *G06T 7/35* (2017.01); *G06T 7/579* (2017.01); *G06T 2207/10024* (2013.01); *G06T 2207/20081* (2013.01); *G06T 2207/20084* (2013.01); *G06T 2207/30244* (2013.01)

(58) Field of Classification Search
CPC . G06T 2207/20081; G06T 2207/20084; G06T 2207/10024; G06K 9/627; G06K 9/00671; G06K 9/4628; G06K 9/6211; G06K 9/00201
See application file for complete search history.

(56) References Cited

U.S. PATENT DOCUMENTS

| | | | |
|---|---|---|---|
| 2014/0016857 A1* | 1/2014 | Richards | G06T 7/55 382/154 |
| 2015/0084951 A1* | 3/2015 | Boivin | H04N 13/275 345/419 |
| 2015/0199585 A1 | 7/2015 | Oh et al. | |
| 2015/0371391 A1 | 12/2015 | Ding et al. | |

OTHER PUBLICATIONS

Fan, et al., "A Point Set Generation Network for 3D Object Reconstruction from a Single Image", Available online at https://arxiv.org/abs/1612.00603, Dec. 2016, 12 pages.

PCT/US2018/039804, "International Search Report and Written Opinion", dated Sep. 24, 2018, 9 pages.

Altwaijry, et al., "Learning to Detect and Match Keypoints with Deep Architectures", Available online at: URL: https://vision.cornell.edu/se3/wp-content/uploads/2016/08/learningdetect-match.pdf, Aug. 1, 2016, pp. 1-12.

EP18824287.9, "Partial Supplementary European Search Report", May 7, 2020, 7 pages.

* cited by examiner

METHOD AND SYSTEM FOR PERFORMING SIMULTANEOUS LOCALIZATION AND MAPPING USING CONVOLUTIONAL IMAGE TRANSFORMATION

CROSS-REFERENCES TO RELATED APPLICATIONS

This application is a nonprovisional of and claims the benefit of priority to U.S. Provisional Patent Application No. 62/526,203, filed Jun. 28, 2017, entitled "METHOD AND SYSTEM FOR PERFORMING SIMULTANEOUS LOCALIZATION AND MAPPING USING CONVOLUTIONAL IMAGE TRANSFORMATION," the content of which is herein incorporated in its entirety.

BACKGROUND OF THE INVENTION

Modern computing and display technologies have facilitated the development of systems for so called "virtual reality" or "augmented reality" experiences, wherein digitally reproduced images or portions thereof are presented to a user in a manner wherein they seem to be, or may be perceived as, real. A virtual reality, or "VR," scenario typically involves presentation of digital or virtual image information without transparency to other actual real-world visual input; an augmented reality, or "AR," scenario typically involves presentation of digital or virtual image information as an augmentation to visualization of the actual world around the user.

Despite the progress made in these display technologies, there is a need in the art for improved methods, systems, and devices related to augmented reality systems, particularly, display systems.

SUMMARY OF THE INVENTION

The present disclosure relates generally to systems and methods for performing simultaneous localization and mapping (SLAM). More particularly, embodiments of the present disclosure provide systems and methods for performing SLAM using convolutional image transformation in head-mounted virtual reality (VR), mixed reality (MR), and/or augmented reality (AR) devices. Embodiments of the present invention enable the accurate detection of user/device movement by analyzing the images captured by a device worn by the user, thereby improving the accuracy of the displayed virtual content. Although the present invention may be described in reference to an AR device, the disclosure is applicable to a variety of applications in computer vision and image display systems.

In a first aspect of the present invention, a method for computing a homography based on two images is provided. The method may include receiving a first image based on a first camera pose and a second image based on a second camera pose. The method may also include generating a first point cloud based on the first image and a second point cloud based on the second image. The method may further include providing the first point cloud and the second point cloud to a neural network. The method may further include generating, by the neural network, the homography based on the first point cloud and the second point cloud. In some embodiments, the first point cloud and the second point cloud are two-dimensional (2D) point clouds. In some embodiments, the first image was captured by a first camera at a first instant in time. In some embodiments, the second image was captured by the first camera at a second instant in time after the first instant in time. In some embodiments, the first point cloud and the second point cloud are generated using a first neural network, and the neural network is a second neural network.

In some embodiments, the neural network was previously trained by, for each three-dimensional (3D) point cloud of one or more 3D point clouds containing a plurality of points, determining a 3D trajectory within a threshold distance of the plurality of points, sampling the 3D trajectory to obtain a particular first camera pose and a particular second camera pose, the plurality of points being at least partially viewable from the particular first camera pose and the particular second camera pose, projecting, based on the particular first camera pose, the plurality of points onto a first 2D plane to generate a first 2D point cloud, projecting, based on the particular second camera pose, the plurality of points onto a second 2D plane to generate a second 2D point cloud, determining a ground-truth homography between the first 2D point cloud and the second 2D point cloud based on the particular first camera pose and the particular second camera pose, generating, by the neural network, a particular homography based on the first 2D point cloud and the second 2D point cloud, comparing the particular homography to the ground-truth homography, and modifying the neural network based on the comparison. In some embodiments, the plurality of 3D point clouds are generated by sampling one or more geometries. In some embodiments, the particular first camera pose and the particular second camera pose have at least 30% overlap.

In a second aspect of the present invention, an AR device is provided. The AR device may include a camera. The AR device may also include a processor communicatively coupled to the camera and configured to perform operations including: receiving, from the camera, a first image based on a first camera pose and a second image based on a second camera pose, generating a first point cloud based on the first image and a second point cloud based on the second image, providing the first point cloud and the second point cloud to a neural network, and generating, by the neural network, a homography based on the first point cloud and the second point cloud. In some embodiments, the first point cloud and the second point cloud are 2D point clouds. In some embodiments, the first point cloud and the second point cloud are generated using a first neural network, and the neural network is a second neural network.

In a third aspect of the present invention, a non-transitory computer-readable medium is provided. The non-transitory computer-readable medium may include instructions that, when executed by a processor, cause the processor to perform operations including receiving a first image based on a first camera pose and a second image based on a second camera pose, generating a first point cloud based on the first image and a second point cloud based on the second image, providing the first point cloud and the second point cloud to a neural network, and generating, by the neural network, a homography based on the first point cloud and the second point cloud. In some embodiments, the first point cloud and the second point cloud are 2D point clouds. In some embodiments, the first image was captured by a first camera at a first instant in time, and the second image was captured by the first camera at a second instant in time after the first instant in time. In some embodiments, the first point cloud and the second point cloud are generated using a first neural network, and the neural network is a second neural network.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

Figure 1:
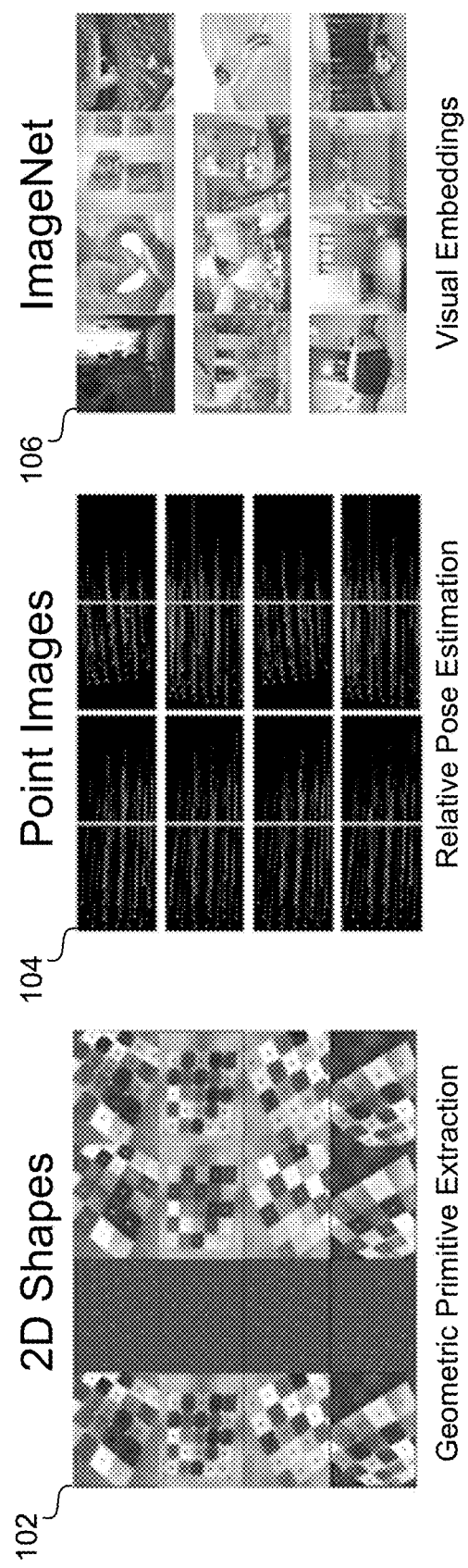
FIG. 1 illustrates a visual overview of three subtasks of the simultaneous localization and mapping (SLAM) approach, in accordance with some embodiments of the present invention.

Much of deep learning success in computer vision tasks such as image categorization and object detection stems from the availability of large annotated databases like ImageNet and MS-COCO. However, for simultaneous localization and mapping (SLAM)-like pose tracking and reconstruction problems, there instead exists a fragmented ecosystem of smaller device-specific datasets such as the Freiburg-TUM RGBD Dataset based on the Microsoft Kinect, the EuRoC drone/MAV dataset based on stereo vision cameras and IMU, and the KITTI driving dataset of vehicles equipped with four cameras, GPS data and a Velodyne laser scanner.

An ImageNet for SLAM does not currently exist. In practice, obtaining accurate ground-truth pose measurements for a large number of environments and scenarios is difficult. Getting accurate alignment between ground-truthing sensors and the Visual SLAM system requires significant effort, and is not easy to scale across variations in different cameras. Photorealistic rendering can be useful, as all relevant geometric variables for SLAM tasks can be recorded with 100% accuracy. Benchmarking SLAM on photorealistic sequences may have advantages, but training on such rendered images often suffers from domain adaptation issues, and many deep nets seem to overfit.

In practice, it is preferable if SLAM models are lean to run at a large scale on embedded platforms such as those in robotics and mixed reality. Embodiments of the present invention focus on geometric consistency as opposed to full frame prediction so that such systems may be deployed on embedded platforms. While full frame predictions made by a deep learning system have certain advantages, in many instances predicting/aligning points is sufficient for metric-level pose recovery. Deployment of deep nets usually involves a custom offline optimization procedure to make the net as small as possible, so in some instances of the present invention, the full visual frame prediction problem is omitted altogether.

Embodiments of the present invention may include a system, referred to as DH-SLAM, for 6 degrees of freedom monocular camera localization in an unknown environment, powered primarily by convolutional neural networks trained to robustly estimate homographies in the presence of high sensor noise, low illumination, and major occlusions. The system may include three deep ConvNets. The first network, MagicPointNet, may operate on single images and extract salient points in the image, which, by design, are isolated and well-distributed in the image and may not utilize any additional post-processing such as non-maximum suppression. The second network, PointHomographyNet, may operate on pairs of the point response maps from the MagicPointNet, and may estimate the homography, which relates the two point images. The homography estimate may then be either re-estimated using standard MVG techniques or upgraded to a fundamental matrix if the scene is highly non-planar. The third network, RelocalizationNet, may transform single images into a low dimensional embedding vector that allows for fast image comparison used for reliable and fast relocalization. The networks are trained with simple synthetic data, making them easy to train because they don't rely on expensive external camera ground truthing equipment or advanced graphics rendering pipelines. The system is fast and lean, capable of running 30+ FPS on a CPU.

In various embodiments of the present invention, three custom SLAM convolutional neural networks are presented together with three separate training domains. However, this particular implementation is not required and one or more of the neural networks may be combined in some embodiments. A monocular SLAM system is presented that is homographically inspired, as homographies may be an important component of each system. Embodiments of the present invention may not use any sort of local feature point descriptors, and may not require manual data annotation or expensive off-line graphics rendering pipelines.

FIG. 1 illustrates a visual overview of three subtasks of the SLAM approach, in accordance with some embodiments of the present invention. At subtask 102, geometric point primitives are extracted from images to remove imaging effects such as sensor noise, illumination, textures and motion blur. At subtask 104, pairs of point images are compared to extract the global pose information that relates the images. At subtask 106, images are compressed to a low dimensional vector for fast image matching.

Subtask 102 relates to mapping an image to a set of geometric entities, like points. One goal of subtask 102 is to undo the damage of nuisance variables like lighting, shadows, and overall global illumination variations. It may also be desirable to extract reliable locations within the input image using a technique similar to corner-detection. However, instead of defining an image corner analytically, a custom 2D shape renderer is used to train the corner detector. The resulting 2D image locations are output semi-densely from the system, because a semi-dense coverage of scene points may be important for robust transformation estimation.

Subtask 104 relates to finding the relative pose between a pair of images. In some instances, homographies may be computed from a CNN trained on pairs of grayscale images, sampled from a large dataset of warped natural images. In some embodiments of the present invention, a CNN is trained using the space of point-images, i.e., the kinds of images that are output by MagicPointNet. Since the space of semi-dense point images may be significantly smaller than the space of full RGB images, significantly more performance may be obtained using a smaller number of neurons than is necessary to handle full RGB images. A pose estimation network presented herein may operate on point-response images, and may run in both homographic and essential modes. The ability to handle the 3D world in two different ways may be important because in the context of multiple-view geometry, an assumption of scene planarity may or may not hold. If the planarity assumption holds, homographies can be estimated and later upgraded to (R,t) estimates without concern for individual point depths. If instead the solver is based on essential matrix estimation, scene planarity provides a degenerate E estimate, and all other estimations may fail. Accordingly, when the viewable scene geometry is highly non-planar, Es, Rs, ts, and point depths may be dealt with directly.

Subtask 106 relates to creating visual embeddings of images. For the other tasks, pose-sensitivity may be important, but for embeddings pose-insensitivity may be desirable. Using real-world images may be important for this task, as learning embeddings on top of engineered representations like 2D Shapes or point response images may be unlikely to assist. Instead, a large freely available dataset of images (i.e., ImageNet) is used, and Homographies are used to warp images. During learning, two images may be forced to have similar embedding vectors if they are homographically related.

Figure 2:
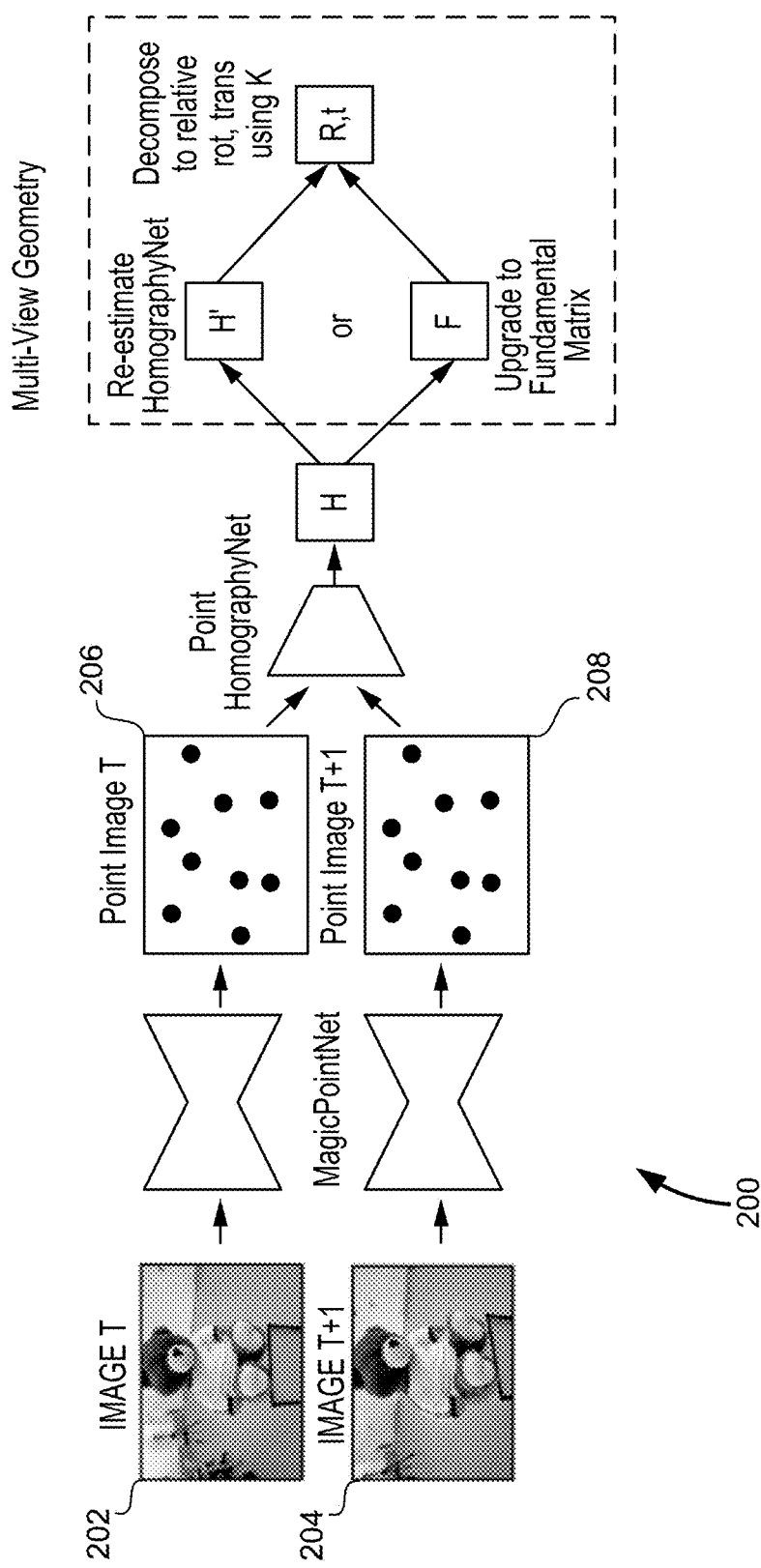
FIG. 2 illustrates a DH-SLAM tracking system, in accordance with some embodiments of the present invention.

FIG. 2 illustrates the general architecture of a DH-SLAM tracking system 200, in accordance with some embodiments of the present invention. In some instances, pairs of images (e.g., image 202 and image 204) are processed by the MagicPointNet, which is trained to detect salient points in the images and to generate a pair of point images (e.g., point image 206 and point image 208). The point images are then processed together by the PointHomographyNet to compute a homography H, which relates the point images at time T to time T+1. The H estimate from the network may often project the points to within a few pixels of each other, thus a simple nearest neighbor correspondence is sufficient to re-estimate a more precise H' for mostly planar scenes, or the H may be upgraded to a fundamental matrix F which better describes non-planar scenes, using multiple view geometry techniques. Both H' and F can then be decomposed into the relative pose of the camera using the camera matrix K.

In some instances, the SLAM system is decomposed into three subsystems: the Magic Point detector which brings images into a canonical subspace of 2D point locations, the global transformation estimation point-based HomographyNet, and a visual image embedding engine called RelocNet. In some embodiments, each subsystem is a separate convolutional neural network. While the MagicPointNet and the RelocNet may both operate on single images, the PointHomographyNet operates on a pair of images. In some embodiments, the networks are able to solve the following problems: detecting robust 2D locations in noisy images, computing the relative pose between two images, and relocalization. Unlike conventional approaches, which rely heavily on both engineered feature descriptors (ORB or SIFT), embodiments of the present invention may not associate descriptors with individual points in images. Unlike these conventional feature-based SLAM systems, relative pose estimation may be performed in a descriptor-less fashion. Embeddings that may be similar to global image-wide descriptors may also be used. The embeddings may be engineered to be pseudo homographic invariant. By design, two images that are related by a homography may be close on a given manifold.

In some instances, a first step may include detecting salient and localizable 2D locations in the image. This step may be performed by computing corner-like response maps such as Harris or FAST, detecting local maxima, and employing non-maximal suppression. Additional steps may be performed to distribute these local maxima throughout the image. This process may involve a high amount of domain expertise and hand engineering, which may limit generalization and robustness. To increase usefulness in a SLAM setting, points detected by a point detector may be well distributed throughout the image and isolated from one another so that correspondence across frames is easy. It may also be desirable that the system detects points in high sensor noise scenarios and low light. In some instances, a confidence score may be obtained for each point that is detected, which can be used to help reject spurious points. It should be noted that these image points need not correspond to local, high-gradient edges in the image, but may instead correspond to other low-level cues such as the centers of blobs, which may utilize a larger receptive field than traditional corner detectors.

Figure 3:
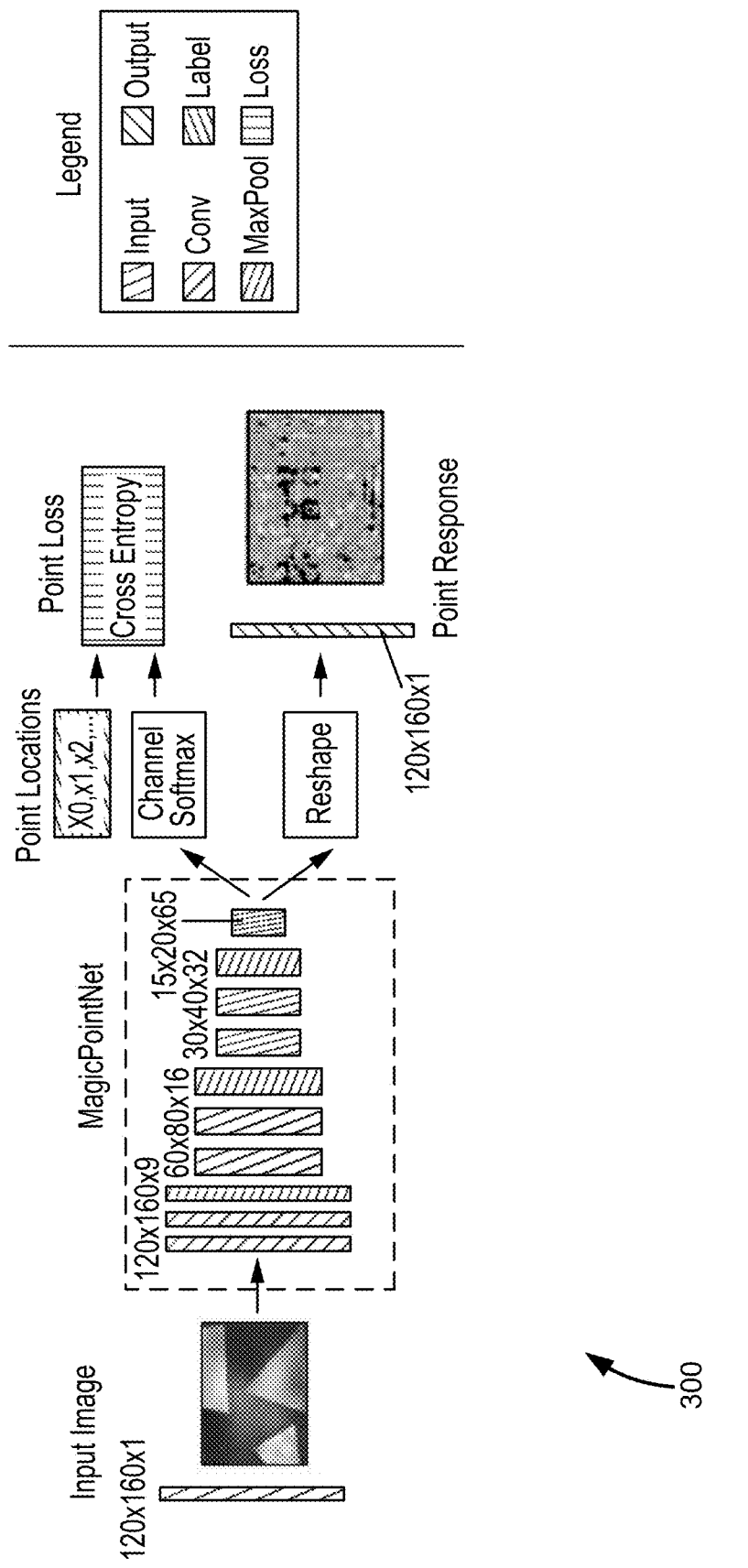
FIG. 3 illustrates a MagicPointNet architecture, in accordance with some embodiments of the present invention.

FIG. 3 illustrates a MagicPointNet architecture 300, in accordance with some embodiments of the present invention. In some embodiments, the MagicPointNet operates on grayscale images and outputs a "point-ness" probability for each pixel of the input. This may be done with a VGG-style encoder combined with an explicit decoder. Each spatial location in the final 15×20×65 tensor may represent a probability distribution over a local 8×8 region plus a single dustbin channel, which may represent no point being detected (8*8+1=65). The network is trained using a standard cross entropy loss, using point supervision from the 2D shape renderer.

In some instances, MagicPointNet is implemented using a custom ConvNet architecture and training data pipeline. In some instances, it may be important to map an image I to a point response image P with equivalent resolution, where each pixel of the output corresponds to a probability of "point-ness" for that pixel in the input. The network design for dense prediction may involve an encoder-decoder pair, where the spatial resolution is decreased via pooling or strided convolution, and then upsampled back to full resolution via upconvolution operations. Because upsampling layers may add a higher computational burden, the MagicPointNet may be implemented with an explicit decoder to reduce the computation of the model. The convolutional neural network may use a VGG style encoder to reduce the dimensionality of the image from 120×160 to 15×20 cell grid, with 65 channels for each spatial position. In some embodiments, the QQVGA resolution may be 120×160 to decrease the computational burden. The 65 channels may correspond to local, non-overlapping 8×8 grid regions of pixels plus an extra dustbin channel, which corresponds to no point being detected in that 8×8 region. The network may be fully convolutional, using 33 3 convolutions followed by BatchNorm normalization and ReLU non-linearity. The final convlayer may be a 1×1 convolution.

Figure 4:
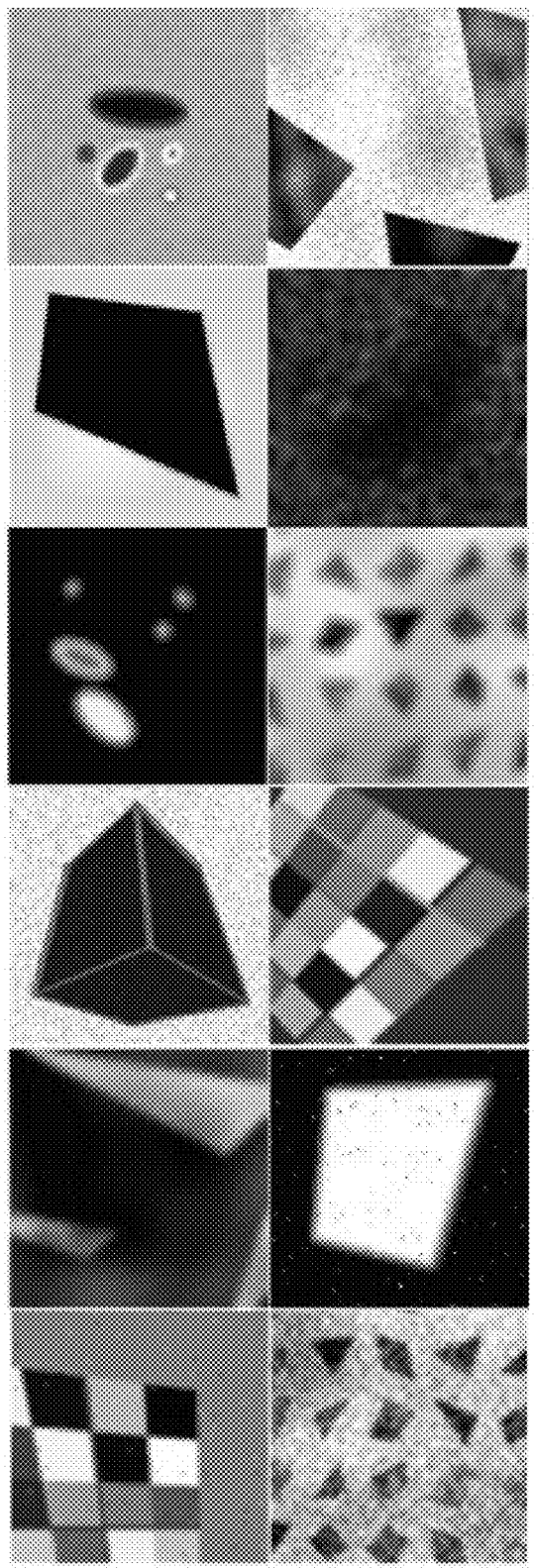
FIG. 4 illustrates MagicPointNet synthetic training data, in accordance with some embodiments of the present invention.

FIG. 4 illustrates MagicPointNet synthetic training data, in accordance with some embodiments of the present invention. In some embodiments, interest points of an image may be uniquely identifiable locations in the image that are stable across a variety of viewpoints, illuminations, and image noise variations. When used as a preprocessing step for a sparse SLAM system, points may be detected that work well for a given SLAM system. Designing and choosing hyper parameters of point detection algorithms may utilize expert and domain specific knowledge.

There is no large database of interest point labeled images that exists today. To avoid an expensive data collection effort, a renderer may be implemented using a computer vision library. In some instances, simple geometric shapes are rendered such as triangles, quadrilaterals, checkerboards, 3D cubes, and ellipses, for each of which the ground truth locations of corners are known. The centroids of the 2D faces of each object are also known, which serve as additional interest points. It should be noted that it would be difficult to design simple and robust detectors that find the centers of 2D faces. After the shapes are rendered, homographic warpings may be applied to each image to augment the number of training examples. Optionally, noise, for example, high amounts of noise, in the form of illumination changes, textured noise, Gaussian noise, salt and pepper noise, combinations thereof, or the like may be applied to one or more of the images (e.g., each image). The data may be generated on the fly, meaning that no example is seen by the network twice. The network may be trained using a standard cross entropy loss after the logits for each cell in the 15×20 grid are piped through a softmax function.

In some instances, the PointHomographyNet produces a homography given a pair of point images as produced by Magic Point. By designing the network to operate on the space of point images and the space of relative poses (the space of point images x the space of relative poses) instead of the space of all images and the space of relative poses (the space of all images x the space of relative poses), several considerations, such as illumination, shadows, and textures may have reduced importance or be ignored. Furthermore, the photometric consistency assumption need not be relied on to hold.

Figure 5:
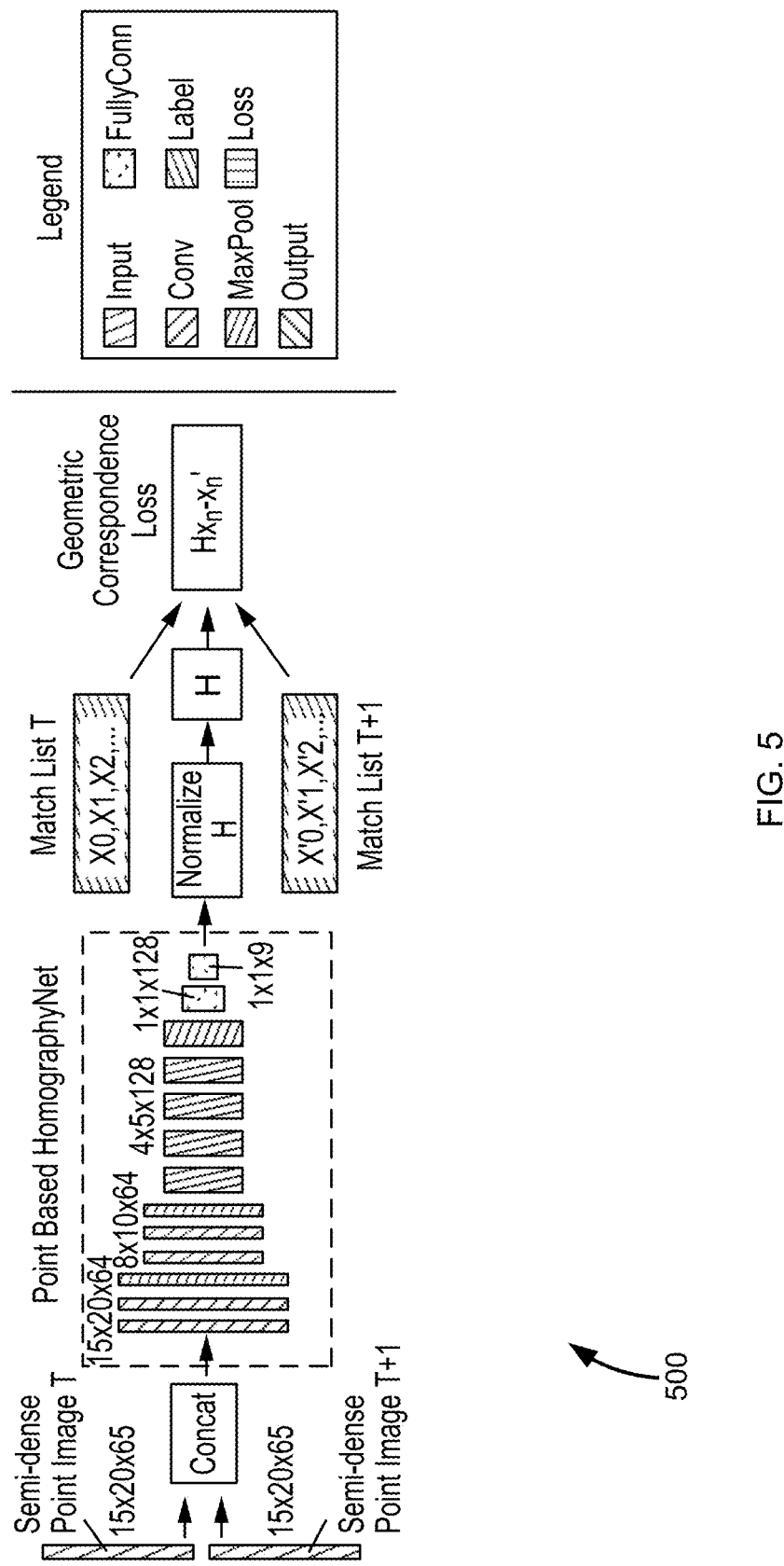
FIG. 5 illustrates a point based HomographyNet architecture, in accordance with some embodiments of the present invention.

FIG. 5 illustrates a point based HomographyNet architecture 500, in accordance with some embodiments of the present invention. In some instances, pairs of binary point images are concatenated and then fed through a VGG-style encoder. The 3×3 homography H is output by a fully connected layer. The homography H may then be normalized such that its bottom right element is one. The loss is computed by transforming points in one image that are known to have a correspondence in the second image into the second images and comparing their positions. The loss function for training PointHomographyNet is shown in Equation (1).

$$L_H = \sum_{n=1}^{N} \|Hx_n - x'_n\|_2 \quad (1)$$

In some instances, the PointHomographyNet is designed to operate directly on the point detections output by MagicPointNet (although it can operate on any traditional point detector). The model may work well on pairs of the semi-dense 15×20×65 images. At this small spatial resolution, the network uses very few computations. After channel-wise concatenation of the inputs, a VGG style encoder may be implemented consisting of 3×3 convolutions, max-pooling, BatchNorm and ReLU activations, followed by two fully connected layers which output the 9 values of the 3×3 homography H.

Figure 6:
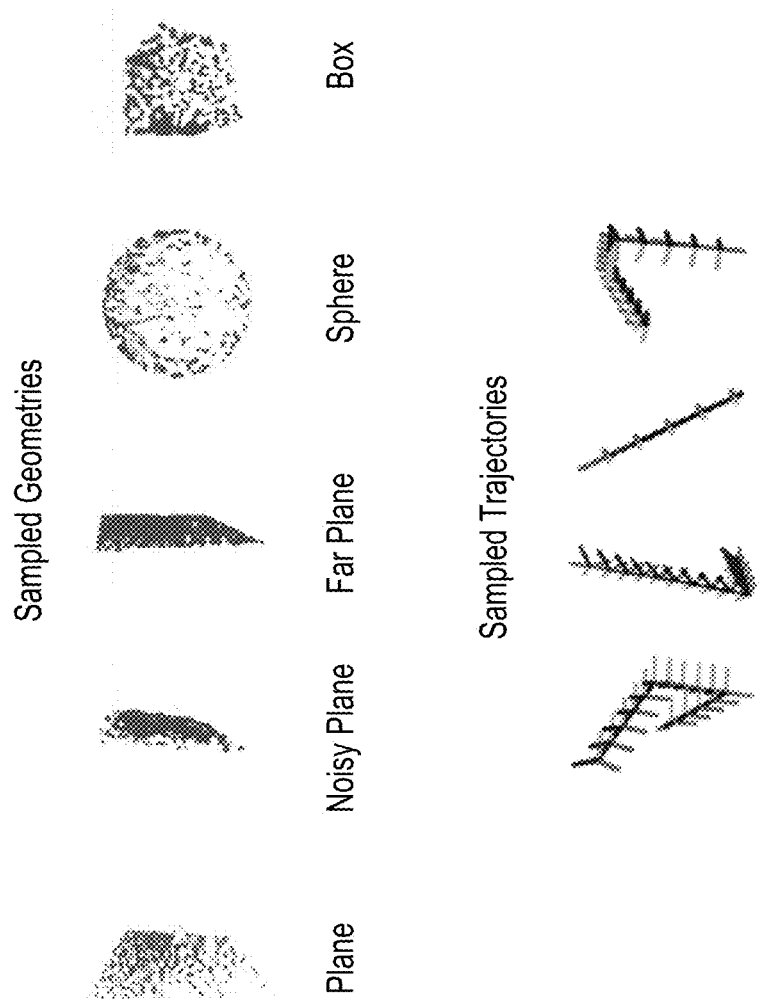
FIG. 6 illustrates point based HomographyNet data generation, in accordance with some embodiments of the present invention.

FIG. 6 illustrates a point based HomographyNet data generation, in accordance with some embodiments of the present invention. In some embodiments, to train the PointHomographyNet, millions of examples may be generated of point clouds rendered into two virtual cameras. The point clouds may be generated from simple 3D geometries, including planes, spheres and cubes. The positions of the two virtual cameras are sampled from random trajectories which consist of piece-wise linear translation and rotations around random axes, as shown in FIG. 6. In some embodiments, camera pairs are randomly sampled that have at least 30% visual overlap. Once the points are projected into the two camera frames, point input dropout is applied to improve the network's robustness to spurious and missing point detections. In some instances, performance is improved by randomly dropping 50% of the matches and randomly dropping 25% of the points independently.

Several considerations are typically taken into account to train the network to directly output the 3×3 matrix. In some instances, training works best when the final FC layer bias is initialized to output the identity matrix, when the coordinates of the homography H are normalized to the range [−1,1], and when the H quantity is normalized such that the bottom right element is one, since the homography H has eight degrees of freedom and nine elements.

In some embodiments, one goal of the embedding network may be to associate a global 128 dimensional descriptor with the input image. In some embodiments, it is desirable that the embedding is homographic invariant. For example, two images that are related by a homography should have the same embedding vector, and two images that are not depicting the same scene content (and thus not the same plane) should have different embedding vectors.

The embedding network may produce an 128 L2-normalized descriptor. This may be done by a fully connected layer on top of a VGG-like encoder network. In some instances, the embedding network may be trained using pairs of homographically related images from the ImageNet dataset. Triplets of image patches (A, A', B) all from the same image may be sampled, where (A, A') have at least 30% overlap and are related by a homography, and where (A,B) have no overlap. The (A, A') positive pair and the (A, B) negative pair used for training the network may be generated. In some embodiments, a siamese network can be used, whereas in other embodiments, a two tower approach or a triplet network may be used, as may be evident to one in skill in the art.

The MagicPointNet was evaluated against traditional corner detection baselines like the FAST corner detector and the Harris corner detector. The PointHomographyNet was evaluated versus a classical ORB+RANSAC based homography estimation engine on both synthetic data and image sequences from real sensors. One advantage of evaluating in the synthetic dot world is that the ground truth correspondences between the point sets are known. Varying amounts of noise may be added to determine how the two algorithms degrade. To evaluate the embedding network, a grid of nearest neighbors is computed using an embedding metric. This was compared to using the base ResNet activations and getting nearest neighbors in activation space.

To evaluate the entire homographic SLAM system, an evaluation was performed on the final (R,t) estimates produced by the matches. Numbers both on tracking (only estimate pose relative to last frame) and embedding-enhanced tracking (estimate pose relative to K images with closest embedding) were observed. Embodiments of the present invention were qualitatively compared against several open source SLAM systems like PTAM, ORB-SLAM, and LSD-SLAM. The results of the evaluations described above indicated that various embodiments of the present invention exhibit superior performance when compared to the conventional approaches.

Embodiments of the present invention may include a small augmented reality system designed around planes, which uses a small number of images along with their associated point images, together with PointHomographyNet and RelocNet. In some instances, dataset collection involves creating a short sequence starting with the head-on configuration of the reference plane with normal [0,0,1], pointing directly towards the camera center. Providing such a head-on initial view of the reference plane allows a disambiguation of the two solutions from the homography decomposition, as well as an initial scale for each 2D landmark.

Figure 7:
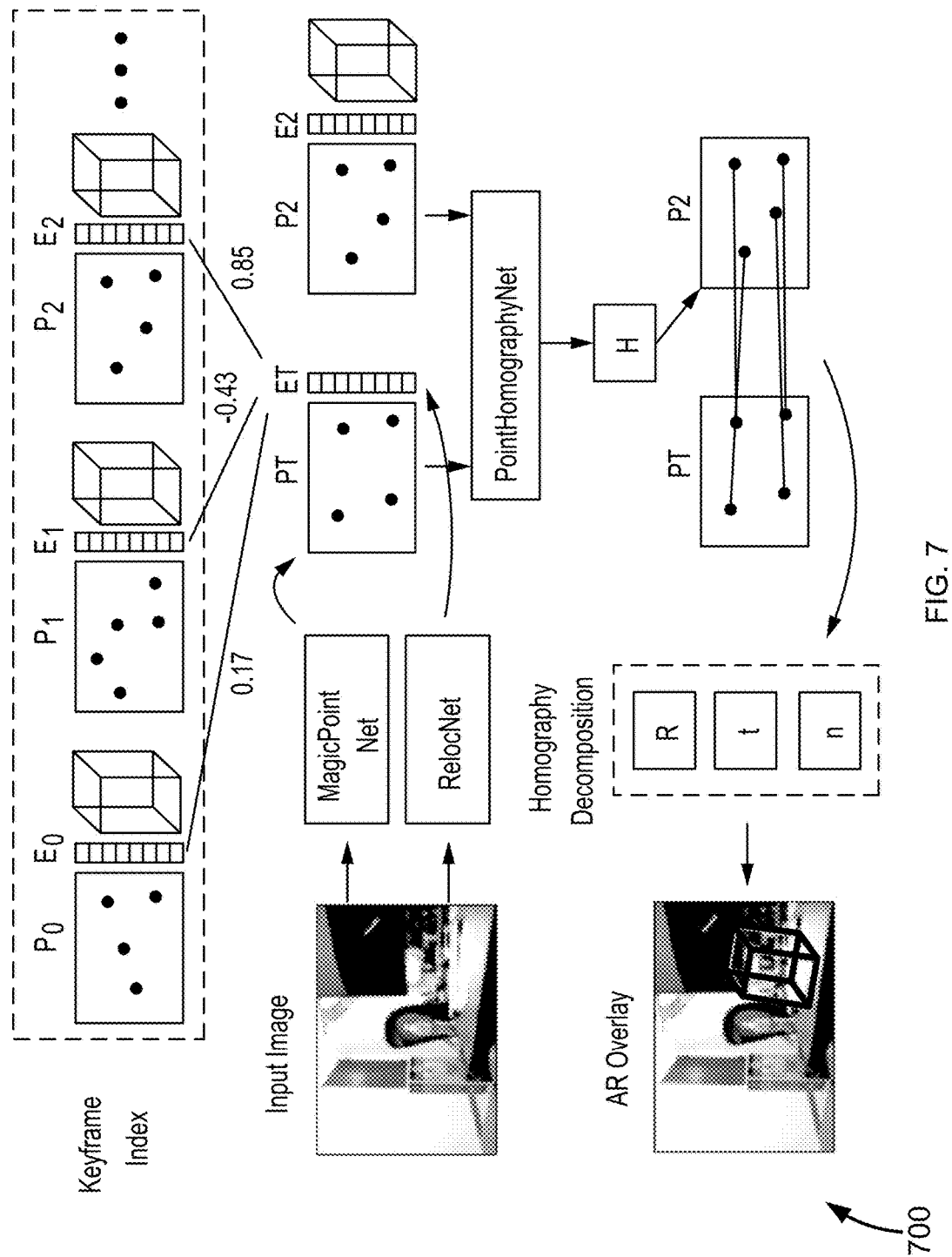
FIG. 7 illustrates a smart anchor SLAM system, in accordance with some embodiments of the present invention.

FIG. 7 illustrates a smart anchor SLAM system 700, in accordance with some embodiments of the present invention. In some embodiments, the user first builds a set of "Smart Anchors" by taking pictures of mostly planar surfaces in an indoor environment. This populates the user's Keyframe Index of pairs of point images and embeddings ($E_0$, $E_1$, $E_2$, ... ). Once the index is built, the system can be run in tracking mode. The MagicPointNet and RelocNet may process the input image at time T to produce a point image $P_T$ and an embedding vector $E_T$. In some embodiments, the dot product of $E_T$ is then computed with one or more of the other (for example, every other) embeddings ($E_0$, $E_1$, $E_2$, ... ) to find the nearest neighbor on the embedding manifold. In the particular embodiment shown in FIG. 7, $E_2$ is selected. The point image $P_2$ corresponding to $E_2$ may then be fed into the PointHomographyNet with $P_T$ to compute the homography H, which transforms the points in $P_T$ into $P_2$. The homography H may lastly be decomposed into the rotation R, translation t and dominant plane n. Finally the content corresponding to the ($P_2$, $E_2$) anchor may be warped and displayed as an AR overlay in the input image.

Figure 8:
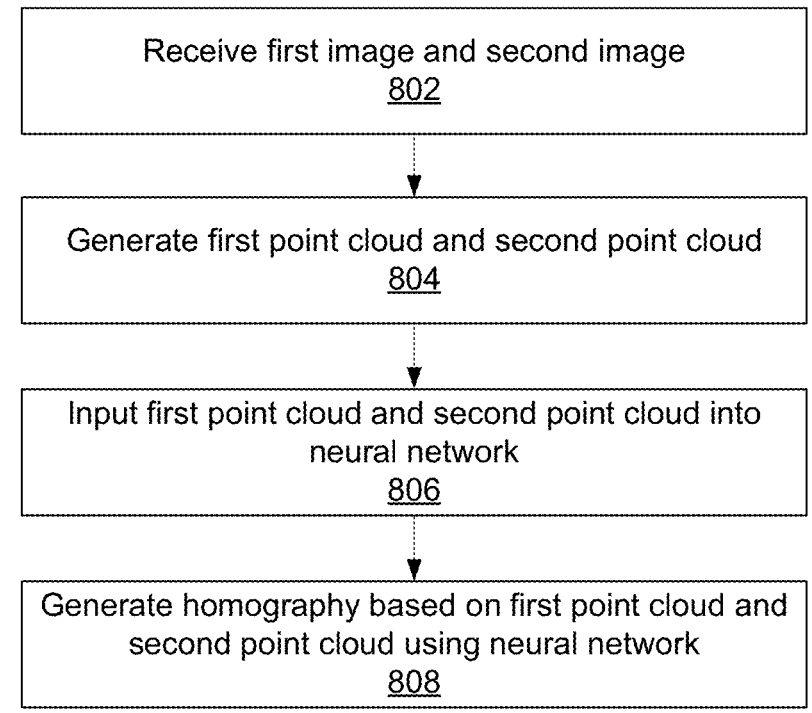
FIG. 8 illustrates a method for computing a homography based on two images, in accordance with some embodiments of the present invention.

FIG. 8 illustrates a method 800 for computing a homography based on two images. Steps of method 800 may be performed in a different order than that shown, and one or more steps of method 800 may be omitted during performance of method 800. One or more steps of method 800 may be performed and/or initiated by a processor configured to execute instructions contained in a non-transitory computer-readable medium.

At step 802, a first image and a second image are received. The first image may be based on a first camera pose and the second image may be based on a second camera pose, the second camera pose being different than the first camera pose. In some embodiments, the first image and the second image may be captured by a same camera (at a first instant in time and a second instant in time, respectively, the second instant in time occurring after the first instant in time), and in other embodiments, the first image may be captured by a first camera and the second image may be captured by a second camera at the same time or at two instants in time.

At step 804, a first point cloud is generated based on the first image and a second point cloud is generated based on the second image. In some embodiments, a first neural network is used to generate the point clouds, i.e., the first image is provided as input to the first neural network and the first point cloud is generated by the first neural network based on the first image, and the second image is provided as input to the first neural network and the second point cloud is generated by the first neural network based on the second image. The first neural network may be the MagicPointNet described herein which may generate 2D point clouds based on the images.

At step 806, the first point cloud and the second point cloud are provided as inputs to a second neural network. The second neural network may be the PointHomographyNet described herein which may generate a homography based on the point clouds. In some embodiments, the first neural network may be combined with the second neural network such that the functionality of the two networks may be combined in a single system.

At step 808, a homography is generated based on the first point cloud and the second point cloud using the second neural network. In some embodiments, the generated homography comprises a matrix (e.g., 3×3) from which a relative rotation and a relative translation (i.e., a relative pose) between the first camera pose and the second camera pose may be extracted.

Figure 9:
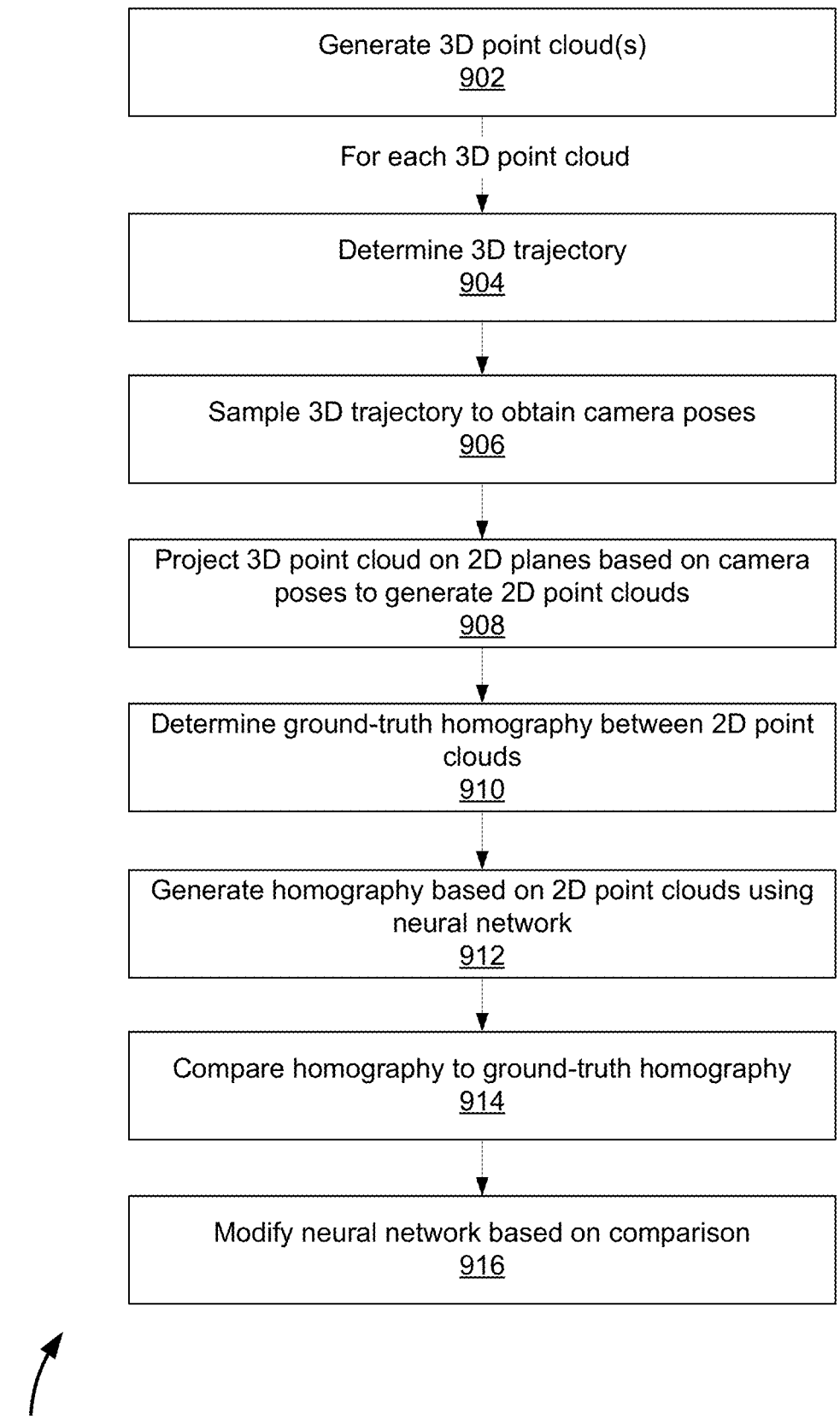
FIG. 9 illustrates a method for training a neural network, in accordance with some embodiments of the present invention.

FIG. 9 illustrates a method 900 for training a neural network. Steps of method 900 may be performed in a different order than that shown, and one or more steps of method 900 may be omitted during performance of method 900. The neural network described in reference to method 900 may be the second neural network described in reference to method 800, which may be the PointHomographyNet described herein. One or more steps of method 900 may be performed and/or initiated by a processor configured to execute instructions contained in a non-transitory computer-readable medium.

At step 902, one or more 3D point clouds are generated. Each of the 3D point clouds may contain a plurality of 3D points. In some embodiments, the one or more 3D point clouds are generated by randomly sampling one or more geometries, such as a plane, a sphere, a cube, among other possibilities. For example, the surfaces of a particular geometry (e.g., a sphere or cube) may be randomly sampled to produce the plurality of 3D points. Alternatively, the edges of a particular geometry may be randomly sampled, or both the surfaces and the edges may be randomly sampled. In some embodiments, the entire volume of a particular geometry may be randomly sampled.

In some embodiments, each of steps 904 to 916 may be performed for each 3D point cloud of the one or more 3D point clouds. At step 904, a 3D trajectory may be determined in the vicinity of the plurality of points. For example, all of the 3D trajectory may be within a threshold distance of the plurality of points. In some embodiments, the 3D trajectory is a linear trajectory formed by determining a random starting location and a random ending location. In other embodiments, or in the same embodiments, the 3D trajectory is a non-linear trajectory (e.g., curved) or is a series of linear trajectories formed by determining a random starting location, a random ending location, and one or more intermediate locations.

At step 906, the 3D trajectory may be sampled to obtain a particular first camera pose and a particular second camera pose. In some embodiments, the plurality of points are at least partially viewable from the particular first camera pose and the particular second camera pose. For example, the obtained camera poses may be restricted to those camera poses that view at least 25%, 50%, 75%, or 100% of the plurality of points. If a camera pose does not meet a predetermined threshold (e.g., that at least 50% of the plurality of points are viewable), then the camera pose is discarded and the 3D trajectory is resampled to obtain another camera pose. In some embodiments, the obtained camera poses are restricted to have at least some threshold of visual overlap (e.g., 30%) with each other. In some embodiments, the visual overlap may correspond to the percentage of points of the plurality of points that are viewable by both the particular first camera pose and the particular second camera pose. In other embodiments, the visual overlap may be calculated based on the shared field of views between the obtained poses.

At step 908, the plurality of points are projected, based on the particular first camera pose, onto a first 2D plane to generate a first 2D point cloud, and similarly, the plurality of points are projected, based on the particular second camera pose, onto a second 2D plane to generate a second 2D point cloud. In some embodiments, the first 2D plane may be orthogonal to an orientation vector of the particular first camera pose and the second 2D plane may be orthogonal to an orientation vector of the particular second camera pose.

At step 910, a ground-truth homography between the first 2D point cloud and the second 2D point cloud is determined based on the particular first camera pose and the particular second camera pose. In some embodiments, the ground-truth homography is determined by first determining a relative rotation and a relative translation between the particular first camera pose and the particular second camera pose, and then forming a homography (matrix) that is consistent in structure with homographies generated by the neural network.

At step 912, the first 2D point cloud and the second 2D point cloud may be provided as input to the neural network, and a particular homography may be generated by the neural network based on the first 2D point cloud and the second 2D point cloud.

At step 914, the particular homography may be compared to the ground-truth homography to, for example, generate an error signal. In some embodiments, the magnitude of the error signal may be proportional to the magnitude of the difference between the particular homography and the ground-truth homography. In one particular embodiment, the error signal is calculated using a standard matrix subtraction method in which corresponding elements of the matrices are subtracted from each other. In other embodiments, or in the same embodiments, the error signal includes a first component corresponding to the difference in relative rotation and a second component corresponding to the difference in relative translation. In some embodiments, the error signal includes a single component corresponding to the difference in relative pose.

At step 916, the neural network is modified based on the comparison between the particular homography and the ground-truth homography performed in step 914 by, for example, adjusting one or more weights or coefficients of the neural network. In some embodiments, the neural network may be modified based on the calculated difference between the homographies (i.e., the error signal) such that a larger error signal causes a greater modification to neural network. In general, modifying the neural network causes the neural network to become more accurate thereby decreasing the difference between the particular homography and the ground-truth homography.

Figure 10:
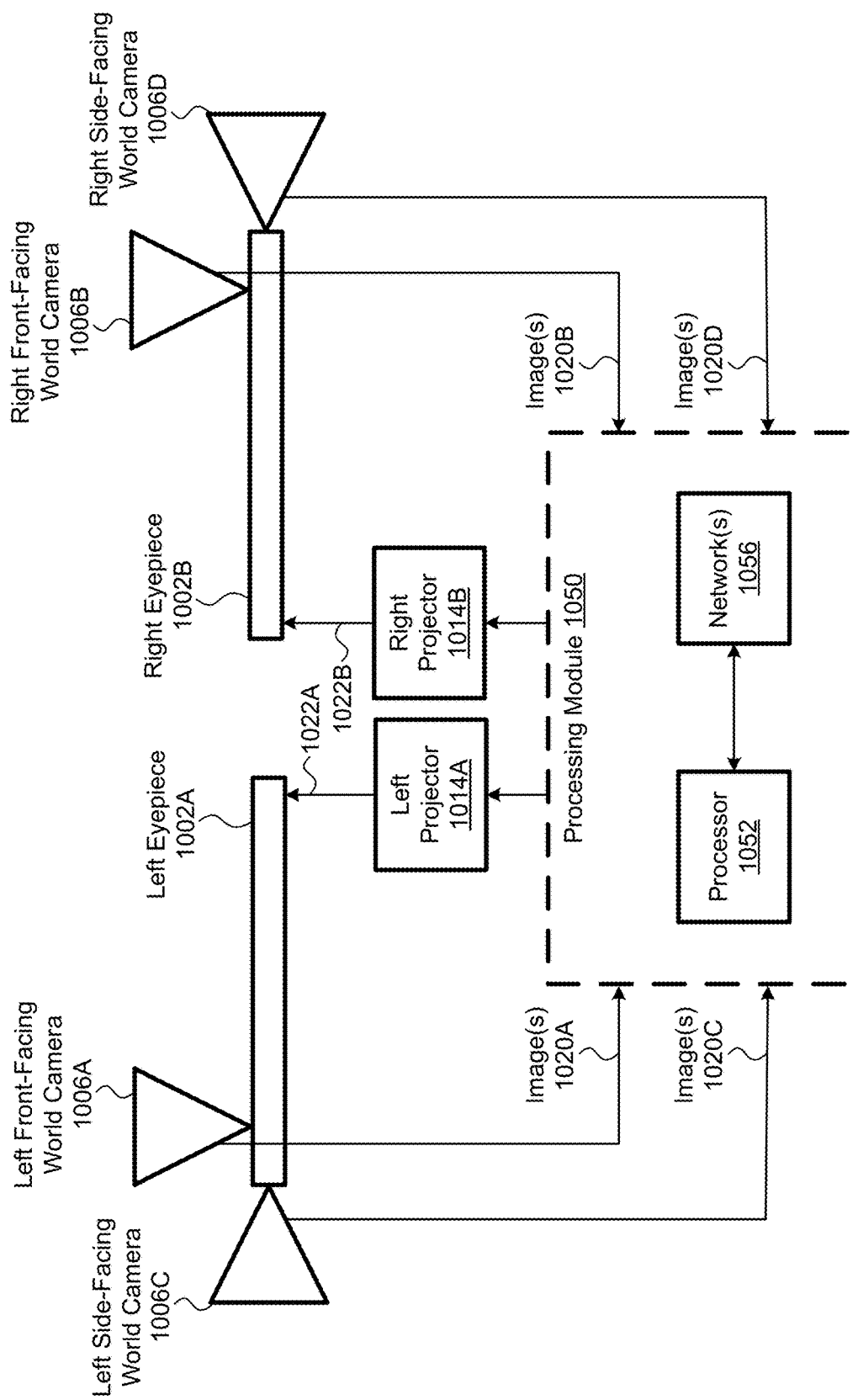
FIG. 10 illustrates a schematic view of a wearable augmented reality (AR) device, in accordance with some embodiments of the present invention.

FIG. 10 illustrates a schematic view of a wearable AR device 1000 that may employ one or more of the embodiments described herein. AR device 1000 may include a left eyepiece 1002A, a right eyepiece 1002B, a left front-facing world camera 1006A attached directly on or near left eyepiece 1002A, a right front-facing world camera 1006B attached directly on or near right eyepiece 1002B, a left side-facing world camera 1006C, a right side-facing world camera 1006D, and a processing module 1050. Some or all of the components of AR device 1000 may be head mounted such that projected images may be viewed by a user. In one particular implementation, all of the components of AR device 1000 shown in FIG. 10 are mounted onto a single device (e.g., a single headset) wearable by a user. In another implementation, processing module 1050 is physically separate from and communicatively coupled to the other components of AR device 1000 by wired or wireless connectivity. For example, processing module 1050 may be mounted in a variety of configurations, such as fixedly attached to a frame, fixedly attached to a helmet or hat worn by a user, embedded in headphones, or otherwise removably attached to a user (e.g., in a backpack-style configuration, in a belt-coupling style configuration, etc.).

Processing module 1050 may comprise a processor 1052, as well as digital memory, such as non-volatile memory (e.g., flash memory), both of which may be utilized to assist in the processing, caching, and storage of data. The data may include data captured from image capture devices (e.g., cameras 1006), microphones, inertial measurement units, accelerometers, compasses, GPS units, radio devices, and/or gyros. For example, processing module 1050 may receive image(s) 1020 from cameras 1006, or more specifically, left front image(s) 1020A from left front-facing world camera 1006A, right front image(s) 1020B from right front-facing world camera 1006B, left side image(s) 1020C from left side-facing world camera 1006C, and right side image(s) 1020D from right side-facing world camera 1006D. In some embodiments, image(s) 1020 may include a single image, a pair of images, a video comprising a stream of images, a video comprising a stream of paired images, and the like. Image(s) 1020 may be periodically generated and sent to processing module 1050 while AR device 1000 is powered on, or may be generated in response to an instruction sent by processing module 1050 to one or more of the cameras.

Eyepieces 1002A and 1002B may comprise transparent or semi-transparent waveguides configured to direct light from projectors 1014A and 1014B, respectively. Specifically, processing module 1050 may cause left projector 1014A to output a left projected image 1022A into left eyepiece 1002A, and may cause right projector 1014B to output a right projected image 1022B into right eyepiece 1002B. In some embodiments, each of eyepieces 1002 may each comprise a plurality of waveguides corresponding to different colors and/or different depth planes.

Cameras 1006A and 1006B may be positioned to capture images that substantially overlap with the field of view of a user's left and right eyes, respectively. Accordingly, placement of cameras 1006A and 1006B may be near a user's eyes but not so near as to obscure the user's field of view. Alternatively or additionally, cameras 1006A and 1006B may be positioned so as to align with the incoupling locations of projected images 1022A and 1022B, respectively. Cameras 1006C and 1006D may be positioned to capture images to the side of a user, e.g., in a user's peripheral vision or outside the user's peripheral vision. Image(s) 1020C and 1020D captured using cameras 1006C and 1006D need not necessarily overlap with image(s) 1020A and 1020B captured using cameras 1006A and 1006B.

During operation of AR device 1000, processing module 1050 may use a trained network 1056 to compute a homography based on two captured images by any of cameras 1006. The estimated homography may be used by processor 1052 to render virtual content that more accurately reflects changes in the user's field of view due to movement of the user. Network 1056 may be an artificial neural network, a convolutional neural network, a deep network, or any type of network or system that can "learn" progressively by processing examples. In some embodiments, network 1056 comprises a collection of connected nodes that are capable of transmitting signals from one to another. Processor 1052 may communicate with a single network 1056 or, in some embodiments, processor 1052 may communicate with multiple neural networks such as a first network (corresponding to, e.g., MagicPointNet), a second network (corresponding to, e.g., PointHomographyNet), and a third network (corresponding to, e.g., RelocNet), etc.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered. Accordingly, the above description does not bind the scope of the claims.

As used herein and in the appended claims, the singular forms "a", "an", and "the" include plural references unless the context clearly dictates otherwise. Thus, for example, reference to "a user" includes a plurality of such users, and reference to "the processor" includes reference to one or more processors and equivalents thereof known to those skilled in the art, and so forth.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method for computing a homography based on two images, the method comprising:
   receiving a first image based on a first camera pose and a second image based on a second camera pose;
   generating a first 2D point cloud based on the first image and a second 2D point cloud based on the second image;
   providing the first 2D point cloud and the second 2D point cloud to a neural network; and
   generating, by the neural network, the homography based on the first 2D point cloud and the second 2D point cloud, the neural network having been previously trained by:
      generating a 3D point cloud containing a plurality of points;
      obtaining two camera poses from which the plurality of points are at least partially viewable, the two camera poses being different from the first camera pose and the second camera pose;
      projecting the plurality of points onto two 2D planes using the two camera poses to generate two 2D point clouds;
      generating, by the neural network, a particular homography based on the two 2D point clouds;
      determining a ground-truth homography based on the two camera poses; and
   modifying the neural network using the particular homography and the ground-truth homography.

2. The method of claim 1, wherein the first image was captured by a first camera at a first instant in time, and wherein the second image was captured by the first camera at a second instant in time after the first instant in time.

3. The method of claim 1, wherein the first 2D point cloud and the second 2D point cloud are generated using a first neural network, and wherein the neural network is a second neural network.

4. The method of claim 1, the neural network having been previously trained by:
   determining a 3D trajectory within a threshold distance of the plurality of points; and
   sampling the 3D trajectory to obtain the two camera poses.

5. The method of claim 1, wherein the 3D point cloud is generated by sampling one or more geometries.

6. The method of claim 1, wherein the two camera poses have at least 30% overlap.

7. An augmented reality (AR) device comprising:
   a camera; and
   a processor communicatively coupled to the camera and configured to perform operations including:
      receiving, from the camera, a first image based on a first camera pose and a second image based on a second camera pose;
      generating a first 2D point cloud based on the first image and a second 2D point cloud based on the second image;
      providing the first 2D point cloud and the second 2D point cloud to a neural network; and
      generating, by the neural network, a homography based on the first 2D point cloud and the second 2D point cloud, the neural network having been previously trained by:
         generating a 3D point cloud containing a plurality of points;
         obtaining two camera poses from which the plurality of points are at least partially viewable, the two camera poses being different from the first camera pose and the second camera pose;
         projecting the plurality of points onto two 2D planes using the two camera poses to generate two 2D point clouds;
         generating, by the neural network, a particular homography based on the two 2D point clouds;
         determining a ground-truth homography based on the two camera poses; and
      modifying the neural network using the particular homography and the ground-truth homography.

8. The AR device of claim 7, wherein the first 2D point cloud and the second 2D point cloud are generated using a first neural network, and wherein the neural network is a second neural network.

9. The AR device of claim 7, the neural network having been previously trained by:
   determining a 3D trajectory within a threshold distance of the plurality of points; and sampling the 3D trajectory to obtain the two camera poses.

10. The AR device of claim 7, wherein the 3D point cloud is generated by sampling one or more geometries.

11. The AR device of claim 7, wherein the two camera poses have at least 30% overlap.

12. A non-transitory computer-readable medium comprising instructions that, when executed by a processor, cause the processor to perform operations comprising:
  receiving a first image based on a first camera pose and a second image based on a second camera pose;
  generating a first 2D point cloud based on the first image and a second 2D point cloud based on the second image;
  providing the first 2D point cloud and the second 2D point cloud to a neural network; and
  generating, by the neural network, a homography based on the first 2D point cloud and the second 2D point cloud, the neural network having been previously trained by:
    generating a 3D point cloud containing a plurality of points;
    obtaining two camera poses from which the plurality of points are at least partially viewable, the two camera poses being different from the first camera pose and the second camera pose;
    projecting the plurality of points onto two 2D planes using the two camera poses to generate two 2D point clouds;
    generating, by the neural network, a particular homography based on the two 2D point clouds;
    determining a ground-truth homography based on the two camera poses; and
  modifying the neural network using the particular homography and the ground-truth homography.

13. The non-transitory computer-readable medium of claim 12, wherein the first image was captured by a first camera at a first instant in time, and wherein the second image was captured by the first camera at a second instant in time after the first instant in time.

14. The non-transitory computer-readable medium of claim 12, wherein the first 2D point cloud and the second 2D point cloud are generated using a first neural network, and wherein the neural network is a second neural network.

15. The non-transitory computer-readable medium of claim 12, the neural network having been previously trained by:
  determining a 3D trajectory within a threshold distance of the plurality of points; and
  sampling the 3D trajectory to obtain the two camera poses.

16. The non-transitory computer-readable medium of claim 12, wherein the 3D point cloud is generated by sampling one or more geometries.

17. The non-transitory computer-readable medium of claim 12, wherein the two camera poses have at least 30% overlap.

* * * * *